March 21, 1961 A. SALZER 2,976,369

FIELD TELEPHONE

Filed April 9, 1957

Inventor

United States Patent Office 2,976,369
Patented Mar. 21, 1961

2,976,369

FIELD TELEPHONE

Adolf Salzer, Franz Lisztstrasse 14, Bremen, Germany

Filed Apr. 9, 1957, Ser. No. 652,333
Claims priority, application Germany Apr. 11, 1956
11 Claims. (Cl. 179—84)

The present invention relates to a portable local battery telephone set, and more particularly to a local battery powered device included in the set for producing strong current pulses in the telephone line when calling.

Heretofore, in portable telephone sets, a magneto generator has been provided for producing an A.C. call-signal for ringing a bell. Such a generator contributes largely to the volume and weight of the set, thereby frustrating any attempt to reduce its encumbrance as is especially desirable in a field telephone. For dispensing with the magneto generator a transistor oscillator has been provided in a portable telephone for producing a voice-frequency call. However, the transmitted alternating current does not suffice for tripping a drop indicator so that the telephone cannot be used with a drop annunciator as the opposite station. Moreover, connection cannot be made with a station which is merely equipped with a bell as is customary.

Accordingly, the principal object of the invention is to provide in a portable telephone set light-weight means for producing a call-signal which is of the same strength as the magneto signal and thereby apt to actuate a drop indicator or a bell.

Another object of the invention is to provide in a portable telephone set a transistor oscillator which is powered by the local battery and supplies an alternating current voltage which after transforming and rectifying can be used for charging a condenser to a comparatively high voltage, and means for discharging the condenser over the telephone line.

A further object of the invention is a modification of this system in which by suitably charging and discharging condensers current pulses having sequentially alternating directions are produced in the line, thereby simulating the signal produced by a magneto generator.

Still another object of the invention is to provide means for transmitting the alternating voltage produced by the transistor oscillator as a voice-frequency signal in combination with current pulses produced by condenser discharge.

Still a further object of the invention is to employ the transistor primarily provided for the generation of call-signals for amplifying outgoing or incoming speech during the conversation after the connection has been made.

One more object of the invention is to employ the transistor oscillator as a local voice-frequency call generator made operative by a calling relay incorporated in the set.

The parts making up the circuitry of a telephone set according to the invention require so little space that it is possible to inclose the whole in the appropriately shaped handle-bar of a micro-telephone, which also carries a call and a speaking button for one-handed operation. None of the essential performing characteristics of a conventional telephone needs be sacrificed in such a set.

Further objects and the various features of the invention will become evident from the description which follows and the accompanying drawing illustrating preferred forms of the invention.

Figures 1, 2:
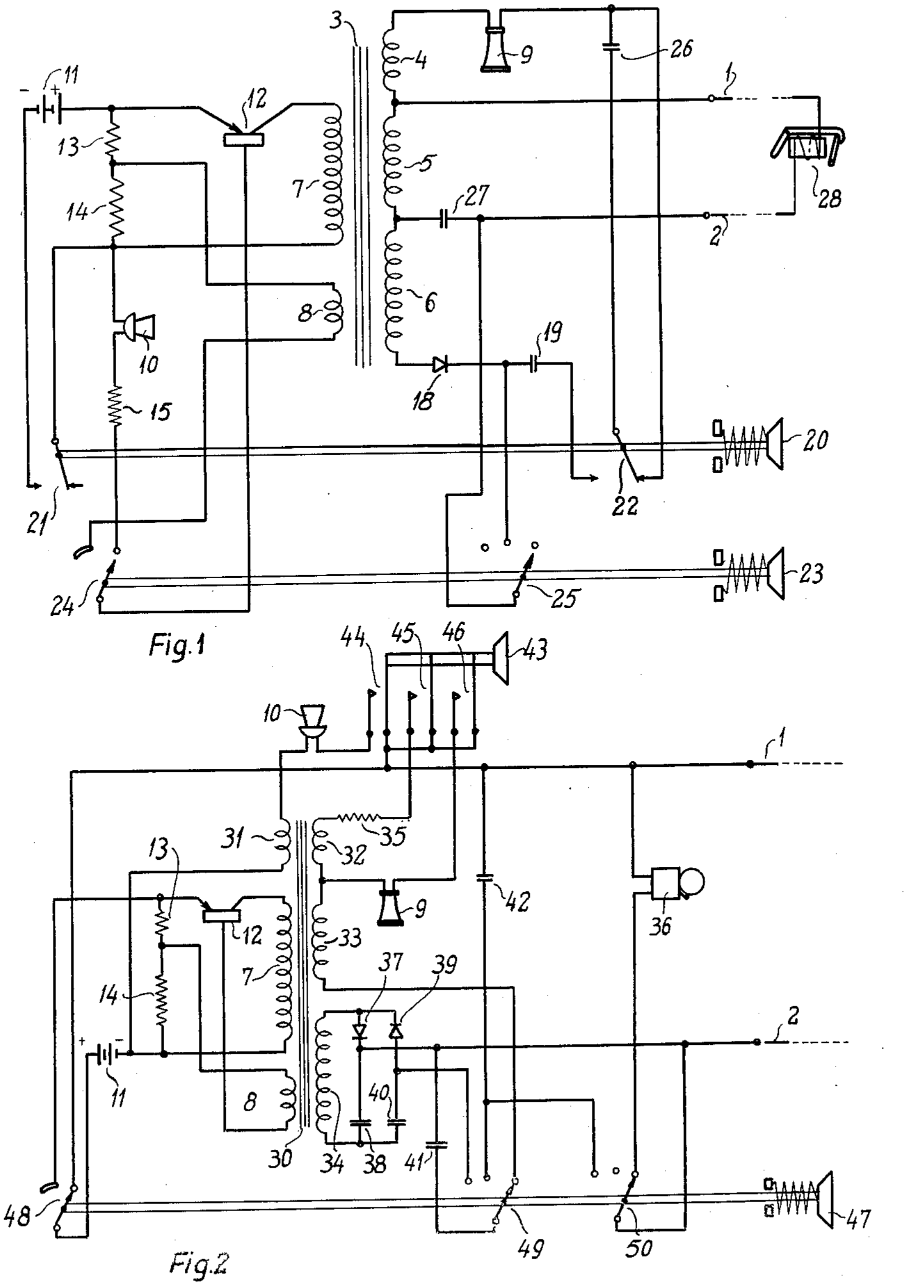
Fig. 1 is a circuit diagram of a portable telephone set incorporating means including a transistor for supplying current pulses in combination with a voice-frequency calling signal to the input of a telephone line and for amplifying the transmitted speech current.
Fig. 2 is a circuit diagram of a portable telephone set incorporating means including a transistor for transmittting current pulses having alternating polarity and a bell to be actuated by a calling signal of such sort.

Fig. 1 shows the circuit diagram of a portable telephone set which is adapted for transmitting and receiving a voice-frequency signal for initiating a connection between similar sets, a direct current pulse being transmitted over the telephone line 1, 2 in conjunction with the voice-frequency signal which is apt to trip a drop indicator in case the opposite station is represented by a drop type switchboard. The circuitry of the set includes a conventional magnetic telephone 9, a granular carbon microphone 10, a local battery 11—having, for instance a voltage of 3 volts—and a telephone transformer 3 having windings 4, 5, 7 for the transmission and reception of speech currents and additional windings 6, 8 the function of which will be explained below. Further, there is provided a transistor 12 which is cut in by switch 21, which is actuated by speaking button 20, and operates either as an alternating current generator or as an amplifier for the current of the microphone 10 according to the position of switch 24, which is actuated by a call button 23. The other parts of the circuit and their functions will be described hereinafter together with the operation of the set.

In the drawing, the speaking button 20, the call button 23 and the switches 21, 22 and 24, 25, respectively actuated thereby, are shown in their normal positions of rest, return to which is obtained by spring action after pushing the buttons. With the position of the switches, as shown, the battery 11 is cut out and a condenser 26, through which telephone 9 is connected across winding 4 of the telephone transformer 3, is short-circuited by switch 22. The microphone 10 and the transistor 12 are inoperative. With this condition of the circuit the set is ready to receive a voice-frequency signal arriving over the line 1, 2 and originating at a similarly equipped station. The voice-frequency signaling current passes through condenser 27—having a capacity of 0.2 microfarad, for instance—and through winding 5 of transformer 3, thereby inducing a voice-frequency alternating-current voltage in winding 4 which causes the telephone to emit a loud audible calling signal.

While talking and listening, i.e. through the entire length of a conversation, speaking button 20 is held pushed. With switch 22 in the off-normal position the short-circuiting path across condenser 26 is broken which results in condenser 26 being inserted in series with telephone 9. The capacity of condenser 26, which, for instance, is 0.005 microfarad, is so chosen in relation to the resistance of the telephone 9 that a calling signal inadvertently transmitted by the user of the set or received with the speaking button depressed is heard only comparatively weakly in the telephone. The attenuation of the received speech also caused by condenser 26 is permissible as usually the opposite station will be a similar set, which means that the speech is amplified by a transistor before transmission.

With speaking button 20 pushed, battery 11 is connected to the transistor 12 which causes microphone 10 also to become operative in consequence of the input current of the transistor flowing through it. The transistor is a PNP-type. Its emitter, which is indicated by an arrow-head, is common to both the input and the output circuit of the transistor which are energized by battery 11 as a common current source one terminal of which is connected to the emitter. The input circuit is connected between emitter and base through switch 24 in normal position and comprises, in addition to battery 11, the microphone 10 and a series resistance 15, which serves for adjusting the working point of the transistor. The output circuit is connected between emitter and collector and includes, in addition to battery 11, winding 7 of transformer 3.

The variations of the input current of the transistor caused by speaking before the microphone produce larger variations of the output current flowing through winding 7 and inducing a voltage in winding 5 which, through condenser 27, is supplied to the input of line 1, 2.

Preparatory to making a call, the speaking button 20, which functions as an off-on switch for the set, has to be pushed, whereby switch 21 connects battery 11 to the transistor 12 and switch 22 closes the circuit comprising the series-connected windings 5 and 6, a rectifier 18 and a condenser 19. When call button 23 is depressed in addition to the speaking button, switch 24 disconnects microphone 10 and inserts the feed-back winding 8 into the input circuit of the transistor. Winding 8 is connected on one side to the base of the transistor through switch 24 and on the other side to the tap of a voltage divider which is connected in parallel to battery 11 and comprises series-connected resistances 13, 14. The ratio of the resistance—having values of 15 and 200 ohms respectively, for instance—is chosen with regard to favorably biasing the base in relation to the emitter for self-excitation of the transistor. In this circuit arrangement the transistor operates as an alternating-current generator producing a voice-frequency voltage across winding 7, which is transmitted by induction to winding 5 and the line 1, 2 as a voice-frequency signal.

The alternating-current voltage across winding 7 is transformed to a considerably higher voltage across the series-connected windings 5 and 6 which, through switch 22 in off-normal position and rectifier 18, charges condenser 19—having a capacity of 2 microfarads, for instance—to a potential of 100 volts, for instance. Due to the special shape of one of the fixed contacts of switch 24, the transistor functioning as an alternating-current generator is operative during the whole of the second half of the length of travel of call button 23, both when being pushed or released, which also determines the length of the voice-frequency calling signal and the duration of the charging of condenser 19. When call button 23 is released, switch 25 temporarily connects one terminal of condenser 19 to line conductor 2 when passing through the middle of its path of travel, the other terminal of condenser 19 being connected through switch 22 in off-normal position to line conductor 1. The direct current path through winding 5 being blocked by condenser 27, condenser 19 discharges into the line 1, 2, thereby generating a strong current pulse which suffices for tripping a drop indicator 28 which may be connected to the other end of the line instead of another telephone set. If the opposite station is designed for a magneto call, the current pulse causes the hammer of the bell to strike once and in addition produces a click in the telephone which may be heard at some distance. The call may be repeated as frequently as desired, as shortly pushing the call button 23 suffices for fully charging condenser 19.

In modification of the arrangement described, the set may be designed to incorporate a relay for switching on a voice-frequency signal generator for a short time, e.g. 1 or 2 seconds, the relay being connected to the line with buttons 20, 23 in normal position and apt to be actuated by a received pulse. Preferably, the transistor oscillator provided in the set is used as the voice-frequency generator, its output being connected to the telephone with the buttons 20, 23 in normal position. The response of the relay to a pulse is prolonged in conventional manner by providing a holding circuit comprising a holding contact, a source of potential and a large capacity condenser. The same purpose may also be accomplished by providing a second relay with delayed release which is actuated by the first. Such a system is particularly adapted for effecting calls over long distances.

The circuit diagram of a portable local battery telephone set shown in Fig. 2 is based upon using a conventional magneto bell for receiving a call and is provided, in addition to such a bell 36, with a device for producing current pulses having sequentially alternating directions as needed for actuating the bell. The current pulses are of sufficient strength in order also to trip a drop indicator. In this modification no provision is made for using the transistor for amplifying the microphone current. The telephone line is designated by numerals 1, 2 as in Fig. 1. Parts 7 to 14 are the same as used in the circuit shown in Fig. 1.

A speaking button 43, a call button 47, and switches 44, 45, 46, and 48, 49, 50 respectively actuated thereby are shown in normal rest position, return to which after pushing the buttons is obtained by spring action. With the buttons in normal position, only bell 36 is connected to the line 1, 2 through switch 50. A calling signal in the shape of current pulses alternating in direction rings the bell 36 in known manner.

During a conversation, speaking button 43 is pushed, thereby closing a circuit including carbon microphone 10, local battery 11 and winding 31 of telephone transformer 30. Simultaneously, a winding 32 of transformer 30 which is serially connected to another winding 33 is connected on the side of the juncture through telephone 9 and switch 46—on the other side through a balancing resistor 35 and switch 45—to line conductor 1. With call button 47 in normal position the other line conductor 2 is connected to that side of winding 33 which is opposed to the juncture with winding 32 through condenser 41 and switch 49. As will be seen, the serially connected windings 32, 33 are coupled through transformer 30 to winding 31 which is included in the microphone circuit. The circuit arrangement so far described, including the telephone line, a microphone, a telephone and a telephone transformer, conforms to conventional telephone practice so that it is not necessary to describe its function in the transmission and reception of speech.

Making a call by actuating call button 47 is independent of the position of speaking button 43. However, normally, in effecting a call the speaking button will not be pushed. Call button 47 being pushed causes switch 48 first to break the microphone circuit and thereafter to connect battery 11 to transistor 12. The latter is included in a self-excited oscillating circuit which is identical with that existing in the arrangement of Fig. 1 with call button 23 pushed and therefore needs not be described once more. Due to the special shape of one of the fixed contacts of switch 48 the self-oscillatory transistor is operative during the entire second half of the path of travel of switch 48, that is to say, both when pushing in and releasing the call button 47. Winding 7 in the output circuit of the transistor is coupled to a winding 34 of transformer 30, the alternating current voltage generated by the transistor being stepped up by transformation. The voltage across winding 34 serves to charge condensers 38, 40—having a capacity of 1 microfarad each, for instance—to opposite potentials of, for instance, 100 volts, each, through rectifiers 37, 39. When call button 47 is depressed completely, switch 49 connects condenser 41—having a capacity of 2 microfarads, for instance—across the series connection of condensers 38, 40. It has been found that pushing and releasing the call button as quickly as possible suffices for charging condenser 41 to maximum charging potential, i.e. 200 volts. When the user lets return the call button to normal position, switch 49 momentarily connects one terminal of condenser 41 through condenser 42—which has the same capacity—to line conductor 1. The other terminal of condenser 41 being permanently connected to line conductor 2, condenser 41 discharges over the line to half the initial charging potential simultaneously charging condenser 42 to an equal and opposite potential. One terminal of condenser 42 is permanently connected to line conductor 1, the other is connected to line conductor 2 through switch 50 when the call button is completely depressed. As a consequence, when, after pushing the call button 47 for the first time, it is pushed for a second time, condenser 42 discharges over the line with the call button in end position and generates a current pulse equal in strength but opposite to that produced by the partial discharge of condenser 41. When pushing the call button for the second time condenser 41 is re-charged to the full potential produced in the rectifier circuit and thereafter discharged to half that potential during the return travel of the call button as has been described. By alternately pushing and releasing the call button in a uniform rhythm the user may send a series of mutually opposite current pulses over the line 1, 2 which ring the bell of another telephone set connected to the other end of the line. If the opposite station is a drop type switchboard the first current pulse passing through the line 1, 2 trips the associated drop indicator.

The invention is not limited to the above described modifications as various changes might be made in the implementation of the invention and the combinations of which it may be part. Sequentially opposite current pulses can also be obtained in the arrangement of Fig. 1 by means of a rotatable switching member rotated by a ratchet device with each push of the call button. Thereby contacts are actuated for momentarily connecting condenser 19 with alternating polarity to the telephone line. Similarly in the arrangement of Fig. 2 contact means for alternately and directly discharging condensers 38, 40 over the line might be momentarily actuated by a rotatable switch member driven by ratchet devices during both the inward and the outward motions of the call button.

What I claim is:

1. A portable telephone set comprising a transistor having input and output circuits, a battery adapted to supply power to said transistor, a transformer core, said output circuit including a first primary winding on said core, another primary winding on said core adapted to be connected in signal feedback relationship to said input circuit, a microphone, means for selectively switching said microphone into said input circuit, a secondary winding on said core connected to a telephone line, a telephone receiver inductively coupled to said line through said core, a charging circuit including another secondary winding on said core, a condenser, and means for successively charging said condenser through said charging circuit and discharging it across said line.

2. A portable telephone set comprising a transformer having multiple windings for transmitting and receiving voice frequency signals, a local battery, a transistor powered from said battery, an oscillating circuit including said transistor, output and feedback windings on said transformer, said feedback winding being connected into the input circuit of said transistor, an additional winding on said transformer for stepping up the output signal of said oscillating circuit, a charging circuit comprising at least one rectifier and connected to said additional winding, a condenser to be charged by said charging circuit, terminals for connecting a telephone line, a telephone receiver inductively coupled to said line, a call button adapted to be cyclically operated, first switching means actuated by said call button for energizing said transistor when depressed, second switching means actuated by said call button for successively first connecting said capacitor to said charging circuit while the transistor is energized and then connecting said capacitor across said line, whereby a unipolar pulse is applied to said line, a microphone, and means for connecting said microphone into the input circuit of said transistor in lieu of said feedback winding.

3. The apparatus of claim 2 and further comprising means for transmitting said alternating current signal derived from said oscillating circuit in conjunction with said unipolar pulse.

4. The apparatus of claim 2, wherein said selective connection of said microphone to said transistor is operative to change said oscillatory circuit into a voice frequency amplifier.

5. A local battery powered portable telephone set comprising a telephone line, an oscillatory circuit including a transistor providing an alternating current signal, said transistor being fed by said local battery, a rectifier circuit responsive to a corresponding alternating current signal from another similar telephone set, first and second capacitors, switching means, a call button for providing a switching cycle of said switching means, said switching means rendering said oscillatory circuit operational during said cycle, said switching means also connecting said first capacitor to said rectifier circuit and said second capacitor across said line during one portion of said cycle and to connect both of said capacitors across said line during another portion of said cycle.

6. A portable telephone set comprising a transistor having input and output circuits, a battery supplying power to said transistor, a transformer core, said output circuit including a first primary winding on said core, another primary winding on said core connected in signal feedback relationship to said input circuit to produce an oscillatory signal in said output circuit, a microphone, means for connecting said microphone to said input circuit to produce an amplified voice signal in said output circuit, a call button, first switching means actuated by said call button to selectively switch said microphone and said other primary winding into said input circuit, a two wire telephone line, a secondary winding on said core, connected to said two wire telephone line, a telephone receiver inductively coupled to said line through said core, a charging circuit, said charging circuit including another secondary winding on said core receiving said oscillatory output signal, a rectifier connected to said last recited winding, a condenser connected to said rectifier, second switching means actuated by said call button for temporarily connecting one terminal of said condenser to one wire of said line, a speak button, third switching means actuated by said speak button to connect the other terminal of said condenser to the other wire of said line, and fourth switching means actuated by said speak button to connect said battery to said input circuit.

7. In a field telephone, a battery powered transistor having input and output circuits, a pair of output terminals, means for coupling said output circuit to said output terminals, feedback means adapted to be connected into said input circuit to produce an oscillatory signal in said output circuit, a microphone adapted to be connected into said input circuit to produce an amplified signal in said output circuit in response to an input voice signal, and means for selectively switching said microphone and said feedback means into said input circuit.

8. A portable telephone instrument comprising a transformer having different windings, terminals for connecting a telephone line, a telephone adapted to be coupled to said terminals through the transformer, microphone means for the production of voice currents to be supplied to said terminals through the transformer, a transistor amplifier having an input and an output circuit the output circuit including a winding of the transformer, another winding of the transformer being adapted to be connected into the transistor input circuit for causing self-excited oscillation of the transistor amplifier when energized and production of an audio-frequency voltage in the output circuit of the transistor amplifier which through the transformer is transmitted to said terminals as a calling signal, a rectifier circuit including a transformer winding for energization by the transistor when oscillating, a condenser to be charged by being connected to the rectifier circuit and to be discharged by being connected to said terminals, manually operable switching means for making operative the transistor amplifier as an oscillator and simultaneously charging said condenser and for alternately discharging said condenser over a line connected to said terminals.

9. A portable telephone instrument comprising a transformer having different windings, terminals connected to one of said windings for connecting a telephone line, a telephone connected to another of said windings, a transistor circuit having an input and an output circuit, said output circuit including a third transformer winding, a rectifier circuit connected to a fourth transformer winding, a condenser charged from said rectifier circuit, a battery for energizing the transistor, a microphone, manually operable switching means passing through different switch positions in forward and backward movement for energizing the transistor and connecting a fifth of said windings to the transistor input at one of said switch positions whereby the transistor circuit becomes self-exciting and an audio-frequency voltage produced by the transistor is transmitted through the transformer to the line and the rectifier circuit, means responsive to the last switch action for charging said condenser, and means responsive to operation of the second switching means for also causing in another of its positions discharge of said condenser over the line, the resulting pulse current being sufficient for tripping a drop indicator.

10. A portable telephone set comprising a transformer having multiple windings, terminals connected to one of the windings for connecting a telephone line, a telephone and a microphone adapted to be coupled to said terminals through the transformer, a local battery, a transistor oscillator adapted to be energized by said battery and including a winding of the transformer in its output circuit and another winding in a feedback circuit, a condenser charging circuit coupled to the output of the transistor oscillator through the transformer and comprising rectifier and condenser means, a condenser to be temporarily connected to the charging circuit for charging, manually operable multiple switching means cyclically making different connections in repeated operation for temporarily energizing the transistor and, in combination with appropriate circuitry, for sending pulse currents into the line connected to said terminals by utilization of the electric energy stored on the condenser.

11. A portable telephone set comprising a transistor amplifier circuit having input and output sections, a battery adapted to supply power to said transistor, a transformer core, said output section including a first winding on said core, a second winding coupled to said first winding and adapted to be connected in signal feedback relationship to said input section, a microphone, means for selectively switching said microphone into said input section, a third winding on said core connected to a telephone line and inductively coupled to said first winding, a telephone receiver connected to a fourth winding on said core inductively coupled to said third winding, a charging circuit including a fifth winding on said core inductively coupled to said first winding, a condenser, and means for successively charging said condenser through said charging circuit and discharging it across said line.

References Cited in the file of this patent

UNITED STATES PATENTS

| | | |
|---|---|---|
| 2,385,339 | Atkins | Sept. 25, 1945 |
| 2,686,835 | Gottlieb | Aug. 17, 1954 |
| 2,759,179 | Kircher | Aug. 14, 1956 |
| 2,761,909 | Wallace | Sept. 4, 1956 |
| 2,782,259 | Dimond | Feb. 19, 1957 |
| 2,808,461 | Thomas | Oct. 1, 1957 |
| 2,842,623 | Lehr | July 8, 1958 |